US011991791B2

(12) United States Patent
Xia et al.

(10) Patent No.: US 11,991,791 B2
(45) **Date of Patent: *May 21, 2024**

(54) ELECTRIC HEATING BLANKET

(71) Applicant: Zhejiang Shuoqi Home Textile Products Co., Ltd., Yuyao (CN)

(72) Inventors: Yibing Xia, Yuyao (CN); Mingwen Qi, Yuyao (CN); Tianming Luo, Yuyao (CN)

(73) Assignee: ZHEJIANG SHUOQI HOME TEXTILE PRODUCTS CO., LTD., Yuyao (CN)

( * ) Notice: Subject to any disclaimer, the term of this patent is extended or adjusted under 35 U.S.C. 154(b) by 724 days.

This patent is subject to a terminal disclaimer.

(21) Appl. No.: 17/118,484

(22) Filed: Dec. 10, 2020

(65) Prior Publication Data

US 2022/0151025 A1 May 12, 2022

(30) Foreign Application Priority Data

Nov. 10, 2020 (CN) ......................... 202011245222.1

(51) Int. Cl.

*H05B 3/34* (2006.01)
*H01R 13/502* (2006.01)
*H05B 1/02* (2006.01)

(52) U.S. Cl.

CPC ......... *H05B 1/0272* (2013.01); *H01R 13/502* (2013.01); *H05B 3/342* (2013.01)

(58) Field of Classification Search

CPC ............................ H01R 13/502; H05B 1/0272
USPC .......................................................... 219/212
See application file for complete search history.

(56) References Cited

U.S. PATENT DOCUMENTS 1,644,306 A * 10/1927 Ledbetter ............. H02G 3/0683 16/108
2012/0193342 A1* 8/2012 Macher .................. H05B 3/342 219/211
2022/0151025 A1* 5/2022 Xia .......................... H05B 3/34

FOREIGN PATENT DOCUMENTS

CN 206152102 U * 5/2017 ............. H01R 13/04
CN 107508065 A * 12/2017
CN 110946449 A * 4/2020
CN 111011949 A * 4/2020
CN 211432042 U * 9/2020
CN 211657438 U * 10/2020

* cited by examiner

*Primary Examiner* — Janie M Loeppke
*Assistant Examiner* — Simpson A Chen

(57) ABSTRACT

The present disclosure discloses an electric heating blanket. The electric heating blanket includes a rectangular electric heating blanket body with an electric heating layer laid inside. A connector which is electrically connected to the electric heating layer and a silicon key is fixed to the central position on the electric heating blanket body. The silicon key is sewn on the electric heating blanket body to facilitate operation and avoid a solution of directly operating by a controller, so that the electric heating blanket is more convenient and fast to use. The electric heating layer and the silicon key are electrically connected to the connector. The connector is connected to a plug through the controller. The controller is used for controlling heating output of the electric heating layer, and exchanging electric heating blanket state information and user control information with the silicon key through the connector.

7 Claims, 5 Drawing Sheets

ELECTRIC HEATING BLANKET

CROSS-REFERENCE TO RELATED APPLICATION

This application claims priority to Chinese Patent Application No. CN 202011245222.1, filed on Nov. 10, 2020, which is incorporated by reference herein in its entirety.

TECHNICAL FIELD

The present disclosure relates to the technical field of blankets, and in particular, to an electric heating blanket.

BACKGROUND

A blanket is a blanket body which covers a human body for preserving heat and heating. The blanket is usually made of a fabric with soft and comfortable hand feel. Most common blankets are made by sewing more than two layers of fabrics. In addition, in order to increase the cold protection and health care functions of the blanket, people also lay an electric heating wire in the traditional blanket. However, the electric heating blanket in the prior art may drag a cumbersome controller, which affects the appearance of the overall blanket, is very inconvenient to operate, and cannot carry out blanket information communication, thereby seriously affecting the use experience of people.

SUMMARY

The objective of the present disclosure is to provide an electric heating blanket, which is more convenient to use and easier to control, and can transmit user control information and product state information.

To achieve the above objective, the present disclosure provides the following solutions:

An electric heating blanket includes a rectangular electric heating blanket body (1) with an electric heating layer (2) laid inside. A connector (3) which is electrically connected to the electric heating layer (2) and a silicone key (4) is fixed to the central position on the electric heating blanket body (1). The silicone key (4) is sewn on the electric heating blanket body (1) to facilitate a manual pressing operation. The silicone key (4) is electrically connected to the connector (3). The connector (3) is connected to a plug (6) through a controller (5). The controller (5) is used for controlling heating output of the electric heating layer (2), and is further used for acquiring and sending the working state information of the electric heating blanket body (1) and receiving the user control information collected by the silicone key (4).

Optionally, the silicone key (4) is sewn in a corner of one end of the electric heating blanket body (1). The connector (3) is fixed to the central position of the electric heating blanket body (1).

Optionally, the silicone key (4) includes a key housing (41) and a circuit board mounted in the key housing (41). A function key (42) with a switching function and a shift position adjusting function and a display screen (43) used for displaying the working state of the blanket are arranged on the key housing (41).

Optionally, an electronic wire (X) which is used for connecting the circuit board in the silicone key (4) and the connector (3) is sewn in the electric heating blanket body (1).

Optionally, the electric heating blanket body (1) is formed by sewing two layers of blanket body fabrics (11). Both the electric heating layer (2) and the electronic wire (X) are sewn between the two layers of the blanket body fabrics (11). The electric heating layer (2) is formed by a heating wire (21) between the two layers of the blanket body fabrics (11).

Optionally, the connector (3) specifically includes:

a connector male end (31), a connector female end, a male end rubber coating (34), a connecting head (32), and a wire bushing (33).

The connector male end is connected with the connecting head (32) in a plug-in manner. The connector female end (31) is connected with the connecting head (32) in a buckling manner. The connector male end is arranged in the male end rubber coating (34). One end of the wire bushing (33) is connected to the connector female end (31). The other end of the wire bushing (33) is connected to each of the silicone key (4) and the heating wire (21). The male end rubber coating (34) is connected to the controller (5).

Optionally, the connector female end (31) specifically includes:

a female end upper cover (311), a PCB (312), a female terminal (313), and a female end lower cover (314).

A first end of the PCB (312) is connected to the wire bushing (33). A second end of the PCB (312) is connected to a first end of the female terminal (313). A second end of the female terminal (313) is connected to the connector male end. The female end upper cover (311) is arranged on the upper surface of the PCB (312). The female end lower cover (314) is arranged on the lower surface of the PCB (312). Both the female end upper cover (311) and the female end lower cover (314) are inserted into an inner cavity of the connecting head (32).

Optionally, the connector male end specifically includes:

a male end upper cover (351), a male terminal (352), and a male end lower cover (353).

The male end upper cover (351) is connected to the connecting head (32) through a hanging hook. A second end of the female terminal (313) is connected to a first end of the male end upper cover (351). A second end of the male end upper cover (351) is connected to the male terminal (352). The male end upper cover (351), the male terminal (352), and the male end lower cover (353) are all arranged in an inner cavity of the male end rubber coating (34).

Optionally, the connector (3) further includes fixed blocks (35).

The fixed blocks (35) are arranged on two sides of the female end upper cover (311).

Compared with the prior art, the electric heating blanket has the following beneficial effects:

The present disclosure provides the electric heating blanket, including a rectangular electric heating blanket body with an electric heating layer laid inside. A connector which is electrically connected to the electric heating layer and a silicone key is fixed to the central position on the electric heating blanket body. The silicone key is sewn on the electric heating blanket body to facilitate operation and avoid a solution of directly operating by a controller, so that the electric heating blanket is more convenient and fast to use. The electric heating layer and the silicone key are electrically connected to the connector. The connector is connected to a plug through the controller. The controller is used for controlling heating output of the electric heating layer, and exchanging electric heating blanket state information and user control information with the silicone key through the connector. The electric heating blanket has the advantages that the use is more convenient, the control is easier, and the silicone key and the controller can transmit the control information and the state information with each other.

BRIEF DESCRIPTION OF THE DRAWINGS

To describe the technical solutions in the embodiments of the present disclosure or in the prior art more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

Figure 1:
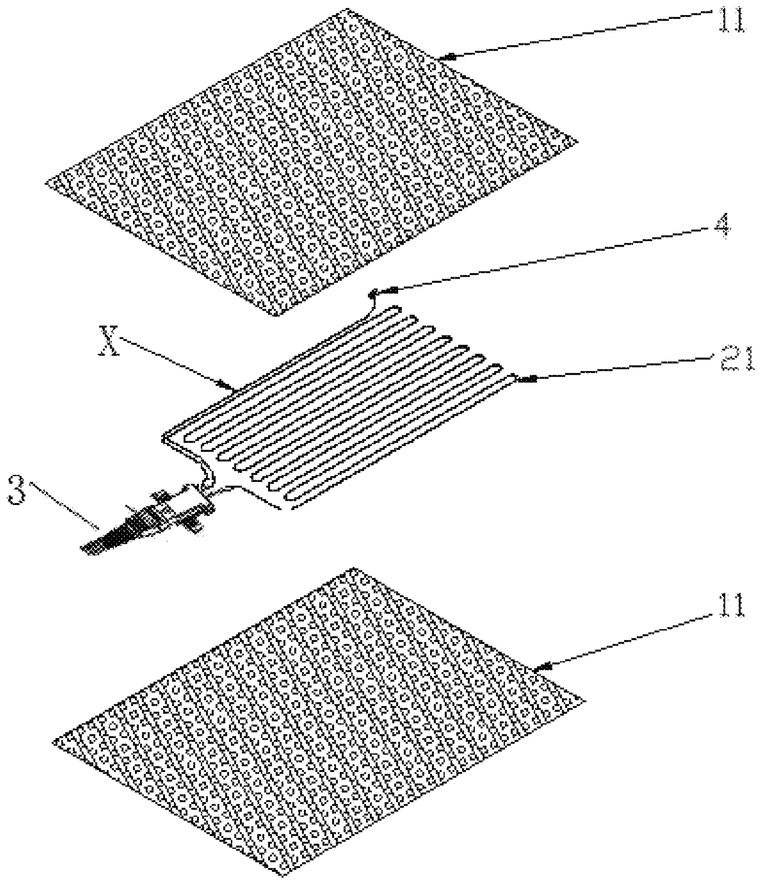
FIG. 1 is a decomposed structural schematic diagram of an electric heating blanket of an embodiment of the present disclosure.
Figure 2:
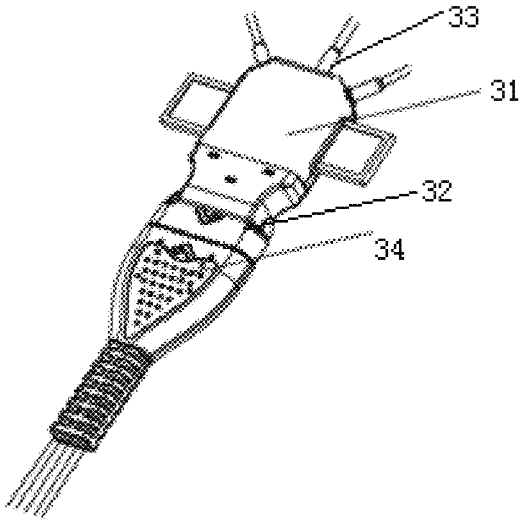
FIG. 2 is an overall schematic structural diagram of a connector of the embodiment of the present disclosure.
Figure 3:
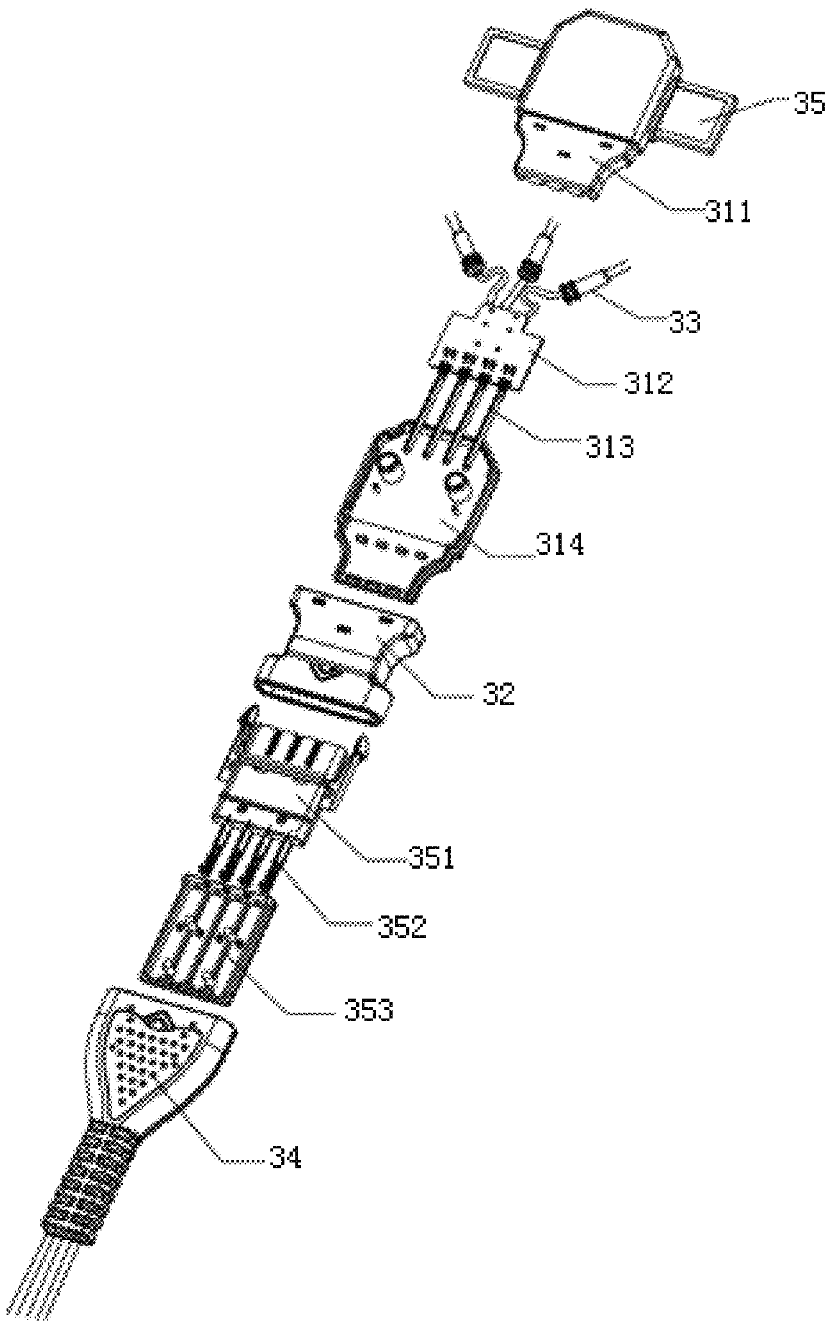
FIG. 3 is an exploded structural schematic diagram of the connector of the embodiment of the present disclosure.

The technical solutions in the embodiments of the present disclosure will be clearly and completely described hereinbelow with the accompanying drawings in the embodiments of the present disclosure. It is apparent that the described embodiments are only part of the embodiments of the present disclosure, not all of the embodiments. On the basis of the embodiments of the present disclosure, all other embodiments obtained on the premise of no creative work of those of ordinary skill in the art fall within the scope of protection of the present disclosure.

The objective of the present disclosure is to provide an electric heating blanket, which is more convenient to use and easier to control, and can transmit user control information and product state information.

In order to make the above objective, features, and advantages of the present disclosure become more apparent and understood, the present disclosure is further described in detail below with reference to the drawings and specific implementation modes.

In the drawings: 1—electric heating blanket body, 11—blanket body fabric, 2—electric heating layer, 21—heating wire, 3—connector, 31—connector female end, 32—connecting head, 33—wire bushing, 34—male end rubber coating, 35—fixed block, 311—female end upper cover, 312—PCB, 313—female terminal, 314—female end lower cover, 351—male end upper cover, 352—male terminal, 353—male end lower cover, 4—silicone key, 41—key housing, 42— function key, 43—display screen, 5—controller, 6—plug, and X—electronic wire.

EMBODIMENTS

Figure 4:
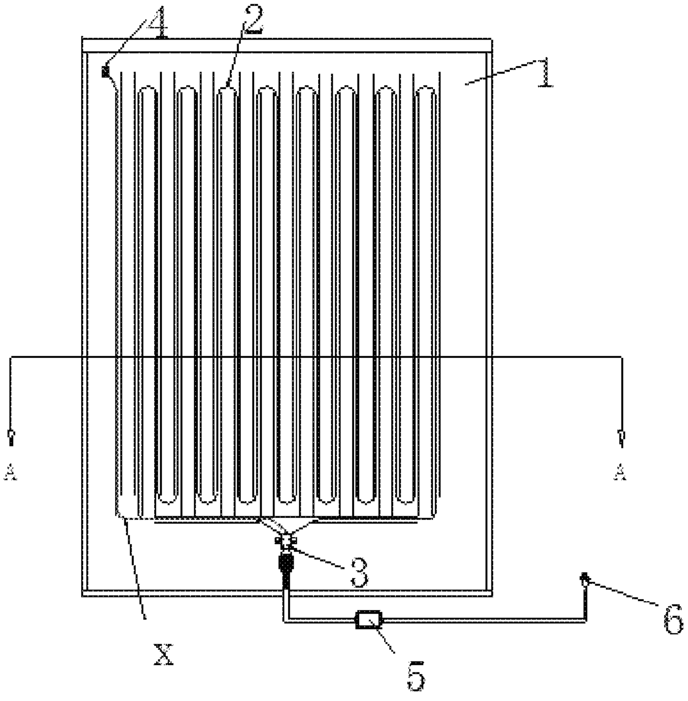
FIG. 4 is a schematic diagram of the electric connection of the electric heating blanket of the embodiment of the present disclosure.
Figure 5:
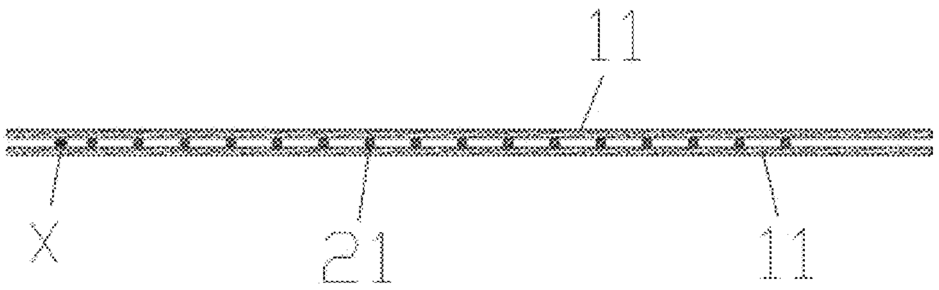
FIG. 5 is a sectional view of an internal structure of the electric heating blanket of the embodiment of the present disclosure.
Figure 6:
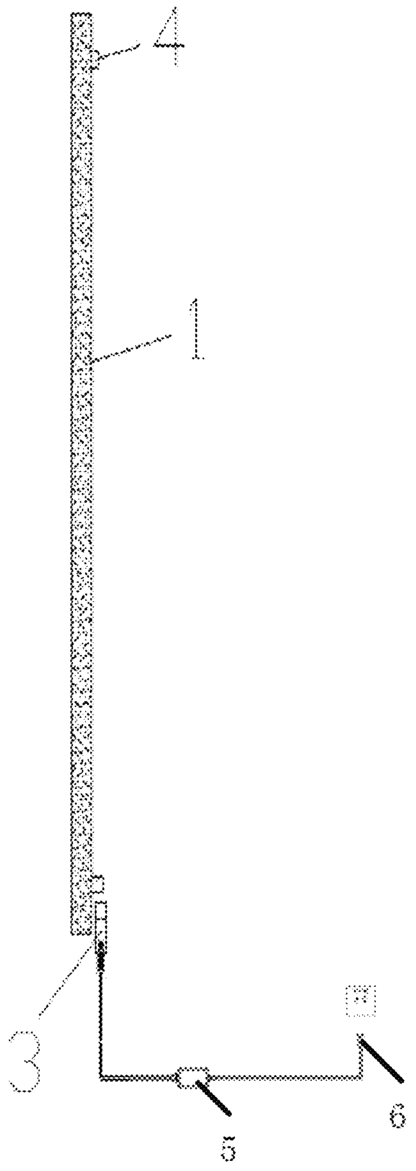
FIG. 6 is a side view of the electric heating blanket of the embodiment of the present disclosure.
Figure 7:
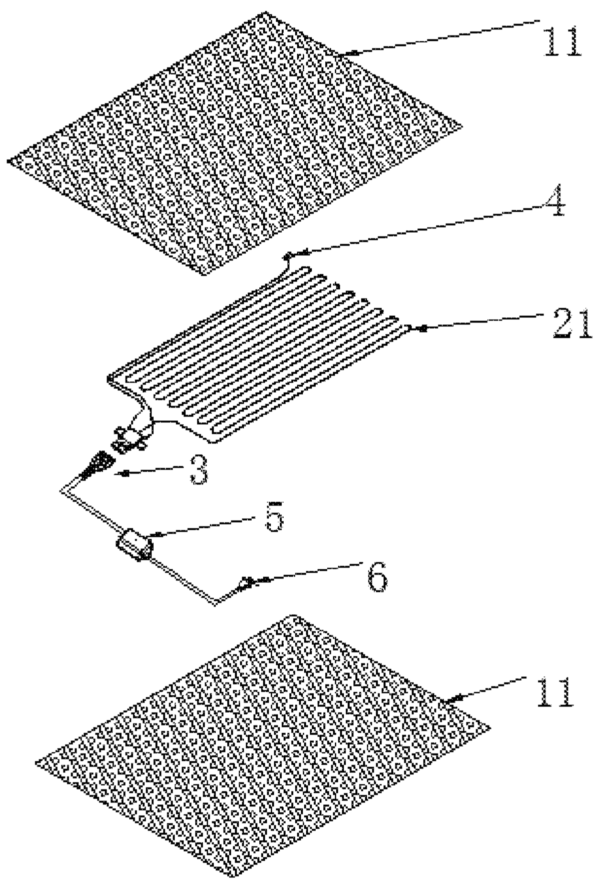
FIG. 7 is an exploded structural schematic diagram of the electric heating blanket of the embodiment of the present disclosure.
Figure 8:
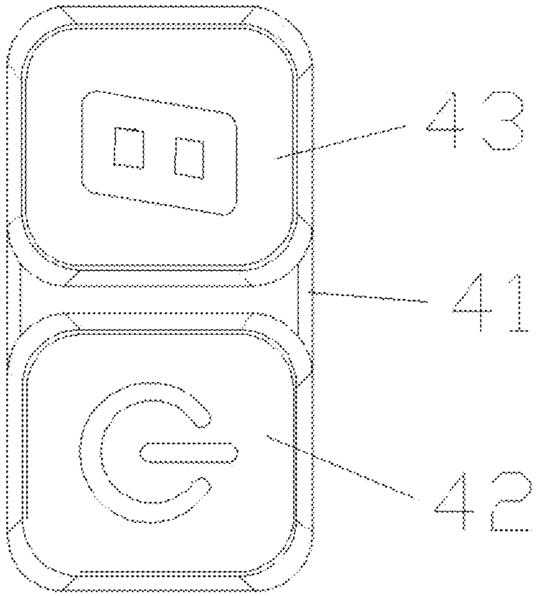
FIG. 8 is a vertical view of the silicone key of the embodiment of the present disclosure.

As shown in FIG. 1 to FIG. 8, FIG. 5 is a sectional view of the internal structure of the electric heating blanket in an A-A direction of FIG. 4. The electric heating blanket provided by the present disclosure includes a rectangular electric heating blanket body 1 with an electric heating layer 2 laid inside.

A connector 3 which is electrically connected to the electric heating layer 2 and a silicone key 4 is fixed to the central position on the electric heating blanket body 1. The silicone key 4 is sewn on the electric heating blanket body 1 to facilitate a manual pressing operation. The silicone key 4 is electrically connected to the connector 3. The connector 3 is connected to a plug 6 through a controller 5. The controller 5 is used for controlling heating output of the electric heating layer, and transmitting the state information of the electric heating blanket body 1 and the user control information collected by the silicone key with the silicone key 4.

The silicone key 4 is sewn in a corner of one end of the electric heating blanket body 1. The connector 3 is fixed to the central position of the electric heating blanket body 1. The silicone key 4 includes a key housing 41 and a circuit board that mounted in the key housing 41. A function key 42 with a switching function and a shift position adjusting function and a display screen 43 used for displaying the working state of the blanket are arranged on the key housing 41. An electronic wire X which is used for connecting the circuit board in the silicone key 4 and the connector 3 is sewn in the electric heating blanket body 1. The electric heating blanket body 1 is formed by sewing two layers of blanket body fabrics 11. Both the electric heating layer 2 and electronic wire X are sewn between the two layers of the blanket body fabrics 11. The electric heating layer 2 is formed by a heating wire 21 between the two layers of the blanket body fabrics 11.

The function key 42 has power switching and shift position adjusting functions, and is used for a user to operate to input a control intention of the user. The display screen 43 is used for displaying the current working state of the blanket, so that the user can intuitively know whether the current state of the blanket is on or off, and a heating shift position of the heating layer when the blanket is on. The power switching and shift position adjusting functions are adjusted cyclically among L-2-3-4-5-6-7-8-9-H-off by pressing the function key 42. The display screen 43 can display the working shift position of the blanket. The silicone key 4 is sewn at the position, facilitating the manual pressing operation of the user, on the electric heating blanket body 1.

A control chip which plays a role of signal operation processing and a control working circuit which is connected to the control chip are arranged on the circuit board. The control working circuit includes a control power supply carrier serial port part, a control power supply extraction part, an MCU control part, a control function key input part, and a product working state display part. The control power supply finally outputs a voltage of DC3.0V, and ensures normal control work. A control MCU is in charge of collecting the control information desired by the user. The user inputs the desired product control information through the key. The display can display the current working state, including a heating shift position, a product failure and the like, of the product.

The connector 3 specifically includes a connector female end 31, a connector male end, a male end rubber coating 34, a connecting head 32, a wire bushing 33, and fixed blocks 35. The connector male end is connected with the connecting head 32 in a plug-in manner. The connector female end 31 is connected with the connecting head 32 in a buckling manner. The connector male end is arranged in the male end rubber coating 34. One end of the wire bushing 33 is connected to the connector female end 31. The other end of the wire bushing 33 is connected to each of the silicone key 4 and the heating wire 21. The male end rubber coating 34 is connected to the controller 5.

The connector female end 31 specifically includes: a female end upper cover 311, a PCB 312, a female terminal 313, and a female end lower cover 314. A first end of the PCB 312 is connected to the wire bushing 33. A second end of the PCB 312 is connected to a first end of the female terminal 313. A second end of the female terminal 313 is connected to the connector male end. The female end upper cover 311 is arranged on the upper surface of the PCB 312. The female end lower cover 314 is arranged on the lower surface of the PCB 312. Both the female end upper cover 311 and the female end lower cover 314 are inserted into an inner cavity of the connecting head 32. The fixed blocks 35 are arranged on two sides of female end upper cover 311.

The connector male end specifically includes: a male end upper cover 351, a male terminal 352, and a male end lower cover 353. The male end upper cover 351 is connected to the connecting head 32 in a buckling manner through a hanging hook. A second end of the female terminal 313 is connected to a first end of the male end upper cover 351. A second end of the male end upper cover 351 is connected to the male terminal 352. The male terminal 352 is arranged on the male end lower cover 353. The male end upper cover 351, the male terminal 352, and the male end lower cover 353 are all arranged in an inner cavity of the male end rubber coating 34.

In order to make the blanket more convenient to use, lighter, and more attractive, a control mode that the controller and the silicone key interact with each other is designed to control normal work of the blanket. A silicone key form is adopted and is sewn at the position, convenient to operate, of the electric heating blanket body lightly and conveniently, which is mainly in charge of collecting the control intention of switching by the user. The controller is connected through a four-core cable. The use experience of the product is greatly improved. The electric heating blanket effectively solves the technical problem that the traditional blanket has to drag a cumbersome controller, which can make the user use more conveniently, and is safe and reliable. In addition, the electric heating blanket can transmit the control information (for example, switching information, temperature adjustment information, and time control) acquired by the silicone key and the state information (for example, temperature information, failure information, and the like) of the electric heating blanket body acquired by the controller in two ways through the cable. The controller can further control the power of the electric heating output, and finally, achieves the purpose of controlling each heating shift position at a constant temperature.

In this specification, specific examples are used to describe the principle and implementation modes of this present disclosure. The description of the embodiments above is only intended to help understand the method and core idea of the present disclosure. In addition, a person of ordinary skill in the art may make modifications based on the idea of the present disclosure with respect to the specific implementation modes and the application scope. In conclusion, the content of this specification shall not be construed as a limitation to the present disclosure.

What is claimed is:

1. An electric heating blanket, comprising:

a rectangular electric heating blanket body with an electric heating layer laid inside, wherein a connector, which is electrically connected to the electric heating layer and a silicone key, is fixed to a central position on the electric heating blanket body;

the silicone key is sewn on the electric heating blanket body;

the silicone key is electrically connected to the connector;

the connector is connected to a plug through a controller; and the controller is used for controlling heating output of the electric heating layer, and is further used for acquiring and sending any information of the electric heating blanket body and receiving a user control information collected by the silicone key; wherein the connector comprises:

a connector male end, a connector female end, a male end rubber coating, a connecting head, and a wire bushing;

the connector male end is connected with the connecting head in a plug-in manner; the connector female end is connected with the connecting head in a buckling manner;

the connector male end is arranged in the male end rubber coating;

one end of the wire bushing is connected to the connector female end;

the other end of the wire bushing is connected to each of the silicon key and the heating wire and the male end rubber coating is connected to the controller;

wherein the connector female end comprises: a female end upper cover, a PCB, a female terminal, and a female end lower cover;

a first end of the PCB is connected to the wire bushing; a second end of the PCB is connected to a first end of the female terminal;

a second end of the female terminal is connected to the connector male end; the female end upper cover is arranged on the upper surface of the PCB;

the female end lower cover is arranged on the lower surface of the PCB; and both the female end upper cover and the female end lower cover are inserted into an inner cavity of the connecting head.

2. The electric heating blanket according to claim 1, wherein:

the silicone key is sewn in a corner of one end of the electric heating blanket body; and the connector is fixed to the central position of the electric heating blanket body.

3. The electric heating blanket according to claim 2, wherein: the silicone key comprises a key housing and a circuit board mounted in the key housing; and a function key with a switching function and a shift position adjusting function and a display screen used for displaying a working state of the blanket are arranged on the key housing.

4. The electric heating blanket according to claim 3, wherein an electronic wire which is used for connecting the circuit board in the silicone key and the connector is sewn in the electric heating blanket body.

5. The electric heating blanket according to claim 4, wherein:

the electric heating blanket body is formed by sewing two layers of blanket body fabrics;

both the electric heating layer and the electronic wire are sewn between the two layers of the blanket body fabrics; and the electric heating layer is formed by a heating wire between the two layers of the blanket body fabrics.

6. The electric heating blanket according to claim 1, wherein the connector male end comprises:

a male end upper cover, a male terminal, and a male end lower cover;

the male end upper cover is connected to the connecting head through a hanging hook;

the second end of the female terminal is connected to a first end of the male end upper cover;

a second end of the male end upper cover is connected to the male terminal; and the male end upper cover, the male terminal, and the male end lower cover are all arranged in an inner cavity of the male end rubber coating.

7. The electric heating blanket according to claim 6, wherein the connector further comprises:

fixed blocks; and the fixed blocks are arranged on two sides of the female end upper cover.

* * * * *